(12) United States Patent
Nishiuma et al.

(10) Patent No.: US 12,475,408 B2
(45) Date of Patent: Nov. 18, 2025

(54) LEARNING SYSTEM, LEARNING METHOD, AND RECORDING MEDIUM

(71) Applicant: Mitsubishi Electric Corporation, Tokyo (JP)

(72) Inventors: Shinichiro Nishiuma, Tokyo (JP); Ryo Kashiwagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 646 days.

(21) Appl. No.: 17/913,169

(22) PCT Filed: Aug. 11, 2020

(86) PCT No.: PCT/JP2020/030571
§ 371 (c)(1),
(2) Date: Sep. 21, 2022

(87) PCT Pub. No.: WO2022/034633
PCT Pub. Date: Feb. 17, 2022

(65) Prior Publication Data
US 2023/0196192 A1    Jun. 22, 2023

(51) Int. Cl.
*G06N 20/00* (2019.01)
(52) U.S. Cl.
CPC .................... *G06N 20/00* (2019.01)
(58) Field of Classification Search
None
See application file for complete search history.

(56) References Cited

U.S. PATENT DOCUMENTS

2019/0012553 A1    1/2019   Maruchi et al.
2019/0163165 A1    5/2019   Gotou et al.
(Continued)

FOREIGN PATENT DOCUMENTS

| CN | 109839915 A | * | 6/2019 | ......... G05B 19/4063 |
| CN | 111272454 A | * | 6/2020 | .......... G01M 99/008 |
| JP | 2015-203936 A | | 11/2015 | |

(Continued)

OTHER PUBLICATIONS

Office Action issued Mar. 17, 2025 in Chinese Patent Application No. 202080099417.1, 24 pages.

(Continued)

*Primary Examiner* — Xuyang Xia
(74) *Attorney, Agent, or Firm* — XSENSUS LLP

(57) ABSTRACT

A learning system (1) generates a diagnosis model through machine learning using learning data, and diagnoses diagnosis target data based on the diagnosis model. A feedback processor (115) outputs incorrect diagnosis data when acquiring a user input indicating that a diagnosis result is incorrect, and corrects the incorrect diagnosis data based on the user input. A similarity determiner (113) determines similarity, to the incorrect diagnosis data output by the feedback processor (115) before being corrected, of the learning data or another diagnosis result of the diagnosis results yet to undergo the feedback process. The feedback processor (115) performs the feedback process on similarity data with at least a specific level of similarity. The learner (111) performs relearning using data including the incorrect diagnosis data corrected in the feedback process.

11 Claims, 8 Drawing Sheets

(56) References Cited

U.S. PATENT DOCUMENTS

2020/0320433 A1* 10/2020 Wu .................. G06F 40/30
2021/0224314 A1* 7/2021 Diaz Garcia ........ G06V 10/764

FOREIGN PATENT DOCUMENTS

JP       2019-16209 A    1/2019
JP       2019-101495 A   6/2019

OTHER PUBLICATIONS

International Search Report and Written Opinion mailed on Nov. 10, 2020, received for PCT Application PCT/JP2020/030571, filed on Aug. 11, 2020, 8 pages including English Translation.
Office Action dated Aug. 27, 2025, issued for the corresponding CN patent application No. 202080099417.1 (23 pages; with partial English translation).

* cited by examiner

LEARNING SYSTEM, LEARNING METHOD, AND RECORDING MEDIUM

CROSS-REFERENCE TO RELATED APPLICATION

The present application is based on PCT filing PCT/JP2020/030571, filed Aug. 11, 2020, the entire contents of which are incorporated herein by reference.

TECHNICAL FIELD

The present disclosure relates to a learning system, a learning method, and a program.

BACKGROUND ART

Systems for diagnosing the state of production equipment or the quality of products are used at production sites. For example, a known system acquires sensor data from multiple sensors installed in production equipment, generates a machine learning model based on the sensor data, and diagnoses the equipment or products using the machine learning model (e.g., Patent Literature 1).

The diagnosis device described in Patent Literature 1 outputs an alarm when a diagnosis result indicates any abnormality in equipment and prompts the user to input feedback as to whether the alarm is correct. Sensor data incorporating the feedback is labeled and stored as labeled training data. The diagnosis device further trains an analytic model using the stored training data to generate an analytic model incorporating feedback information. This facilitates the diagnosis of equipment.

CITATION LIST

Patent Literature

Patent Literature 1: Unexamined Japanese Patent Application Publication No. 2019-101495

SUMMARY OF INVENTION

Technical Problem

The diagnosis device in Patent Literature 1 provides the opportunity of feedback by outputting an alarm. The diagnosis device thus allows feedback simply on diagnosis data determined to be abnormal by the system, without allowing correction of any diagnosis result or learning data incorrectly determined to be normal by the system.

The diagnosis device in Patent Literature 1 also indicates a diagnosis result simply as being normal or abnormal and detects an abnormality that completely matches the abnormality in a past diagnosis result alone. The diagnosis device is thus not designed to detect abnormalities similar to the past abnormalities.

In response to the above issue, an objective of the present disclosure is to provide a learning system, a learning method, and a program for generating a diagnosis model that allows highly accurate diagnosis.

Solution to Problem

To achieve the above objective, a learning system according to an aspect of the present disclosure includes a learner that generates a diagnosis model through machine learning using learning data, a diagnoser that diagnoses diagnosis target data based on the diagnosis model to output diagnosis results, and a feedback processor that performs a feedback process to indicate at least one of the diagnosis results to a user, output incorrect diagnosis data when acquiring a user input indicating that the at least one diagnosis result is incorrect, and correct the incorrect diagnosis data based on the user input. The learning system further includes a similarity determiner that determines similarity, to the incorrect diagnosis data output by the feedback processor before being corrected, of the learning data or another diagnosis result of the diagnosis results yet to undergo the feedback process, and transmits, when determining that the learning data or the other diagnosis result includes similarity data with at least a specific level of similarity, the similarity data to the feedback processor. The feedback processor performs the feedback process on the similarity data transmitted by the similarity determiner. The learner performs relearning using data including the incorrect diagnosis data corrected in the feedback process.

Advantageous Effects of Invention

The structure according to the above aspect of the present disclosure performs relearning using data similar to incorrect diagnosis data determined to be incorrect through feedback performed on a diagnosis result of diagnosis target data. The structure thus allows generation of a diagnosis model that allows highly accurate diagnosis.

DESCRIPTION OF EMBODIMENTS

Embodiment 1

Figure 1:
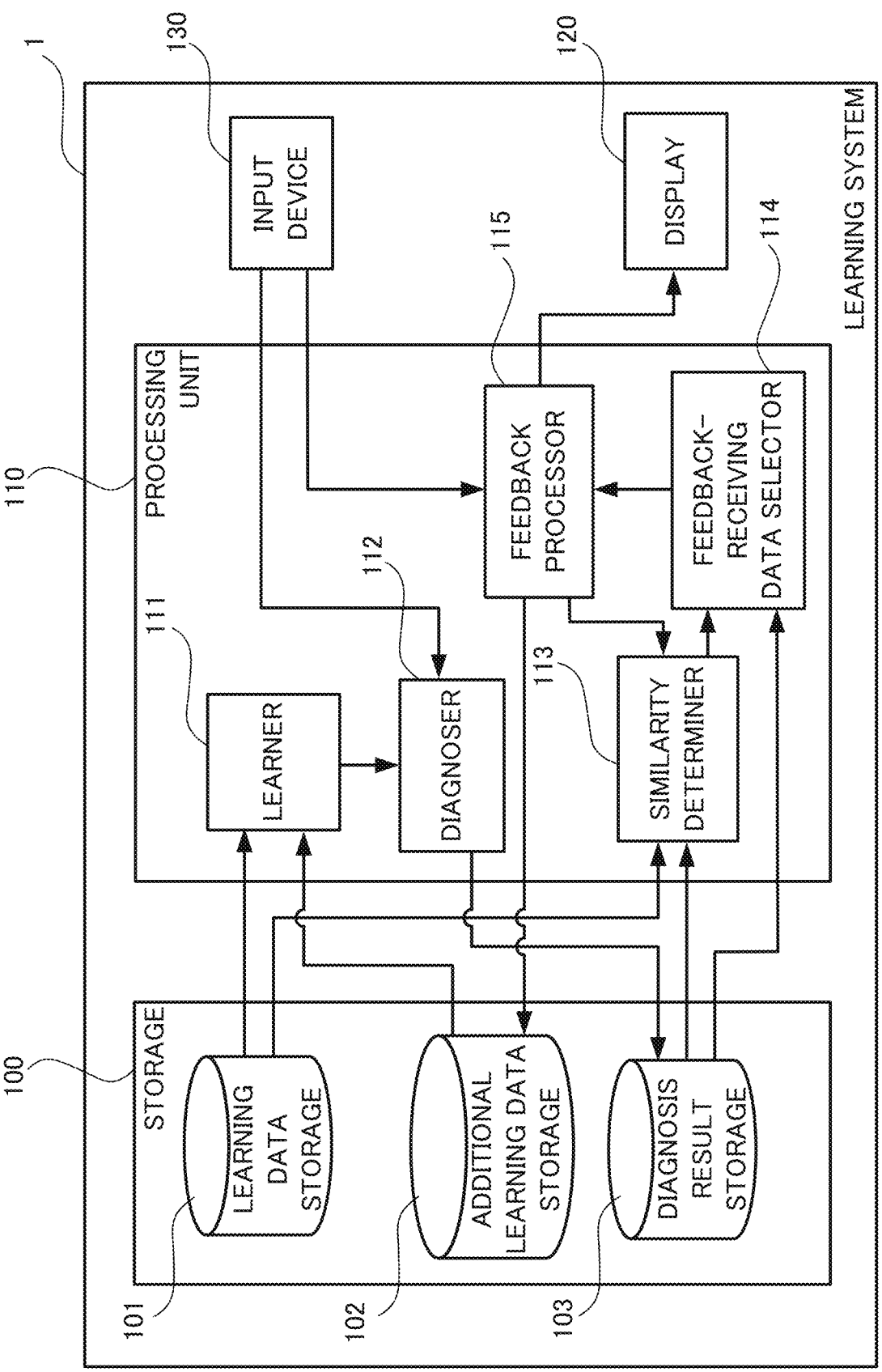
FIG. 1 is a block diagram of a learning system according to an embodiment.

Embodiment 1 of the present disclosure is described below in detail with reference to the drawings. The same reference signs denote the same or corresponding components in the drawings.

FIG. 1 is a block diagram of a learning system 1 according to Embodiment 1. The learning system 1 generates, through learning, a diagnosis model for diagnosing the state of production equipment or the quality of products at a production site.

As illustrated in FIG. 1, the learning system includes a storage 100 that stores data including learning data, and a processing unit 110 that generates a diagnosis model through machine learning using learning data and performs diagnosis using the diagnosis model. The learning system 1 also includes a display 120 that displays information including diagnosis results, and an input device 130 that receives operations and data inputs from a user.

The storage 100 may be any storage device, such as a nonvolatile semiconductor memory including a flash memory and an erasable programmable read-only memory (EPROM), a magnetic disk, a flexible disk, an optical disk, a compact disk, a minidisc, or a digital versatile disc (DVD).

The storage 100 includes a learning data storage 101 that stores learning data for machine learning, an additional learning data storage 102 that stores additional learning data received through feedback, and a diagnosis result storage 103 that stores diagnosis results acquired with a diagnosis model. The storage 100 also stores a machine learning program executable by the processing unit 110.

The processing unit 110 is any processor such as a central processing unit (CPU). When executing the program stored in the storage 100, the processing unit 110 functions as a learner 111 that generates a diagnosis model through machine learning using learning data, a diagnoser 112 that diagnoses diagnosis target data with the diagnosis model, a similarity determiner 113 that determines similarity of input data, a feedback-receiving data selector 114 that selects data for receiving feedback, and a feedback processor 115 that performs a feedback process.

Learning data stored in the learning data storage 101 in the storage 100 includes data about production equipment, test data about the products produced at a factory, component data, and vital data about a producer. More specifically, learning data includes sensor data output from one or more sensors installed to face or attached to production devices, testing devices, components, products, or producers. Examples of sensors include a vibration sensor and a temperature sensor. Learning data may also include information indicating the operating state of a device or the quality of products at acquisition of sensor data. Learning data may be acquired by processing sensor data or combining multiple pieces of sensor data in a specific process.

Each piece of learning data is assigned with a label. The label is information indicating a class of the data piece, or for example, a class determined in accordance with the operating state of equipment at the data acquisition, the qualities of components or products on the production line at the data acquisition, or other information predicted from the data.

Learning data may be stored in any format, or for example, a database format including a relational database or a file format including a comma-separated value (CSV).

The learner 111 in the processing unit 110 acquires learning data from the learning data storage 101, generates a diagnosis model with a prespecified machine learning technique, and outputs the diagnosis model to the diagnoser 112. Any known machine learning technique may be used, such as a neural network, a decision tree, or random forests. The diagnosis model is a machine learning model generated by the learner 111 through machine learning.

When learning data is added, the learner 111 performs learning with the existing diagnosis model using the additional learning data and updates the diagnosis model to output the diagnosis model to the diagnoser 112.

The diagnoser 112 estimates the operating state of a device or the quality of a component or a product, corresponding to diagnosis target data, with the diagnosis model output from the learner 111. Diagnosis hereafter refers to the operation of the diagnoser 112 performed with the diagnosis model to estimate a diagnosis result including the operating state of a device or the quality of a component or a product. Similarly to learning data, the diagnosis target data includes data about production equipment, test data about products produced at a factory, component data, and vital data about producers.

After the diagnosis, the diagnoser 112 assigns to the data a label selected based on the diagnosis and stores information indicating the diagnosis result including the label into the diagnosis result storage 103 in the storage 100.

Before receiving any piece of incorrect diagnosis data from the feedback processor 115, the similarity determiner 113 randomly acquires learning data pieces from the learning data storage 101 and transmits the data to the feedback-receiving data selector 114.

When receiving incorrect diagnosis data from the feedback processor 115, the similarity determiner 113 randomly acquires learning data pieces from the learning data storage 101 and diagnosis results from the diagnosis result storage 103, and transmits similarity data that has high similarity to the incorrect diagnosis data to the feedback-receiving data selector 114.

The feedback-receiving data selector 114 temporarily accumulates the diagnosis results stored in the diagnosis result storage 103 as well as the diagnosis results and the learning data transmitted from the similarity determiner 113, and transmits a selected one of the diagnosis results or learning data pieces to the feedback processor 115.

The additional learning data storage 102 receives label-corrected data from the feedback processor 115, and stores the label-corrected data as additional learning data. For relearning, the learner 111 acquires additional learning data stored in the additional learning data storage 102.

The feedback processor 115 performs a process of feeding back, to a diagnosis model, a user determination as to whether the diagnosis result or the learning data is correct. More specifically, when providing feedback on the diagnosis result, the feedback processor 115 causes the display 120 to display the diagnosis result including the diagnosis target data and the label, and prompts a user to determine whether the diagnosis result is correct. When the user operates the input device 130 to input determination that the diagnosis result is incorrect, the feedback processor 115 transmits the diagnosis target data as incorrect diagnosis data to the similarity determiner 113, and stores, into the additional learning data storage 102, the incorrect diagnosis data with the corrected label as label-corrected data.

The operation performed by the learning system 1 with the above structure is described with reference to the flowcharts in FIGS. 2 to 9.

Figure 2:
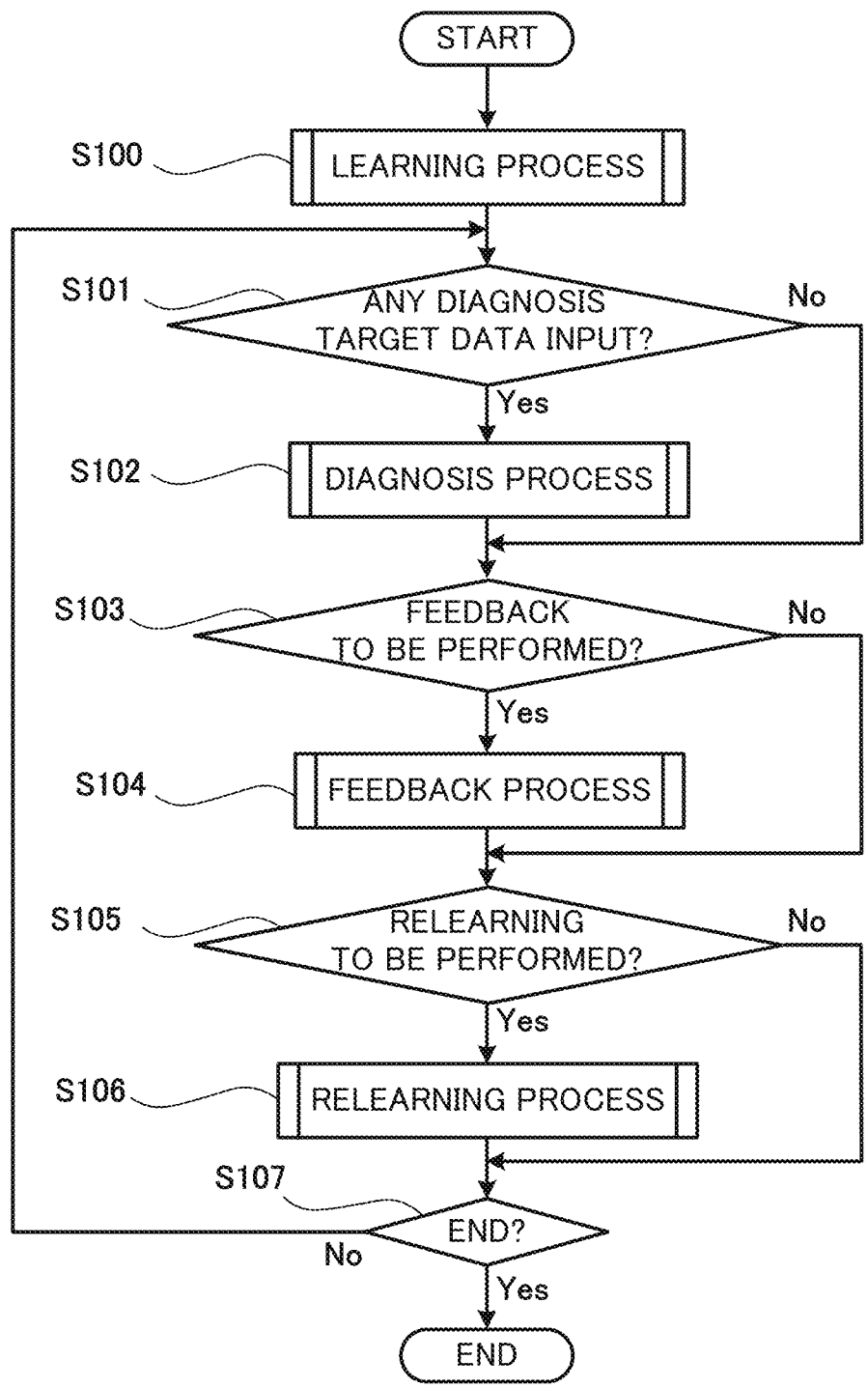
FIG. 2 is a flowchart of the overall process of generating a diagnosis model.

FIG. 2 is a flowchart of the overall process of generating a diagnosis model performed by the processing unit 110.

The learner 111 first performs a learning process with learning data (learning in step S100). After the learning, the diagnoser 112 determines whether any diagnosis target data is input through the input device 130 (step S101). When diagnosis target data is input (Yes in step S101), the diagnoser 112 performs a diagnosis process (diagnosing in step S102). When no diagnosis target data is input (No in step S101), the processing unit 110 advances to step S103 without performing the diagnosis process.

Subsequently, the feedback processor 115 determines whether to perform feedback (step S103). The feedback processor 115 determines whether to perform feedback based on, for example, whether a predetermined period has elapsed from the system startup or the previous feedback. When determining to perform feedback (Yes in step S103), the feedback processor 115 performs the feedback process (performing a feedback process in step S104). When the feedback processor 115 determines not to perform feedback (No in step S103), the processing unit 110 advances to step S105.

Subsequently, the learner 111 determines whether to perform relearning (step S105). When the additional learning data storage 102 stores a sufficient volume of data or a user provides an instruction to perform relearning, the learner 111 determines to perform relearning in step S105. When the learner 111 determines to perform relearning (Yes in step S105), the learner 111 performs the relearning process (relearning in step S106).

When the learner 111 determines not to perform relearning (No in step S105), the processing unit 110 advances to step S107. When the user inputs an instruction to end the process (Yes in step S107), the processing unit 110 ends the process. When the process is not to end (No in step S107), the processing unit 110 returns to step S101 and repeats the process in steps S101 to S107.

Figure 3:
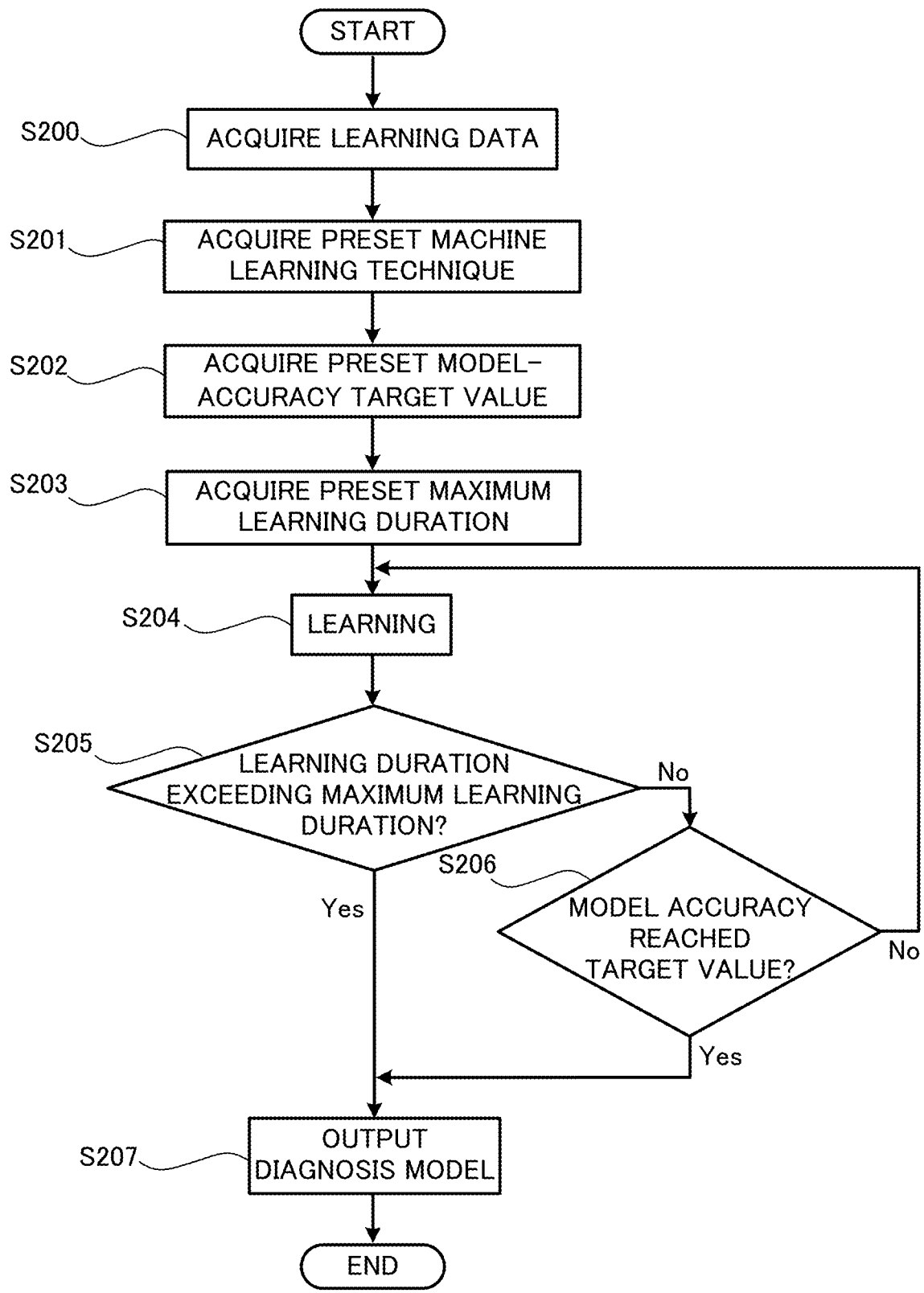
FIG. 3 is a flowchart of a learning process.

The learning process performed in step S100 in FIG. 2 is now described. FIG. 3 is a flowchart of the learning process.

The learner 111 first acquires learning data from the learning data storage 101 (step S200). The learner 111 then acquires a preset machine learning technique (step S201), a preset model-accuracy target value (step S202), and a preset maximum learning duration (step S203).

Subsequently, the learner 111 performs learning with the learning data acquired in step S200 using the machine learning technique acquired in step S201 (step S204). During learning, the learner 111 determines, at predetermined intervals, whether the time elapsed from the learning start (hereafter referred to as learning duration) has exceeded the maximum learning duration acquired in step S203 (step S205). When the learning duration has exceeded the maximum learning duration (Yes in step S205), the learner 111 advances to step S207 to output the diagnosis model to the diagnoser 112 (step S207) and ends the learning process.

When the learning duration has yet to exceed the maximum learning duration (No in step S205), the learner 111 determines whether the model accuracy of the generated diagnosis model has reached the model-accuracy target value acquired in step S202 (step S206). When the model accuracy of the diagnosis model has reached the model-accuracy target value (Yes in step S206), the learner 111 advances to step S207 to output the diagnosis model to the diagnoser 112 and ends the learning process. When the model accuracy of the diagnosis model has yet to reach the model-accuracy target value (No in step S206), the learner 111 returns to step S204 and continues the learning process.

Figure 4:
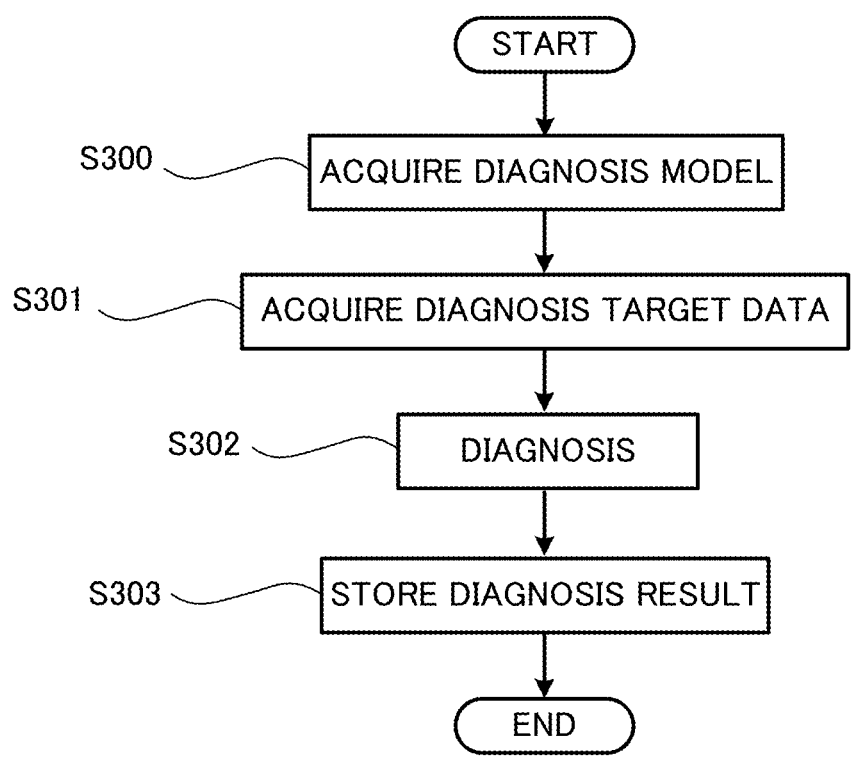
FIG. 4 is a flowchart of a diagnosis process.

The diagnosis process performed in step S102 in FIG. 2 is now described. FIG. 4 is a flowchart of the diagnosis process.

The diagnoser 112 first acquires the diagnosis model output from the learner 111 in step S207 in FIG. 3 (step S300). Subsequently, the diagnoser 112 acquires diagnosis target data input into the input device 130 (step S301). The diagnoser 112 then performs diagnosis by inputting the diagnosis target data acquired in step S301 into the diagnosis model acquired in step S300 (step S302). The diagnoser 112 then stores the diagnosis result into the diagnosis result storage 103 (step S303), and ends the process.

Figure 5:
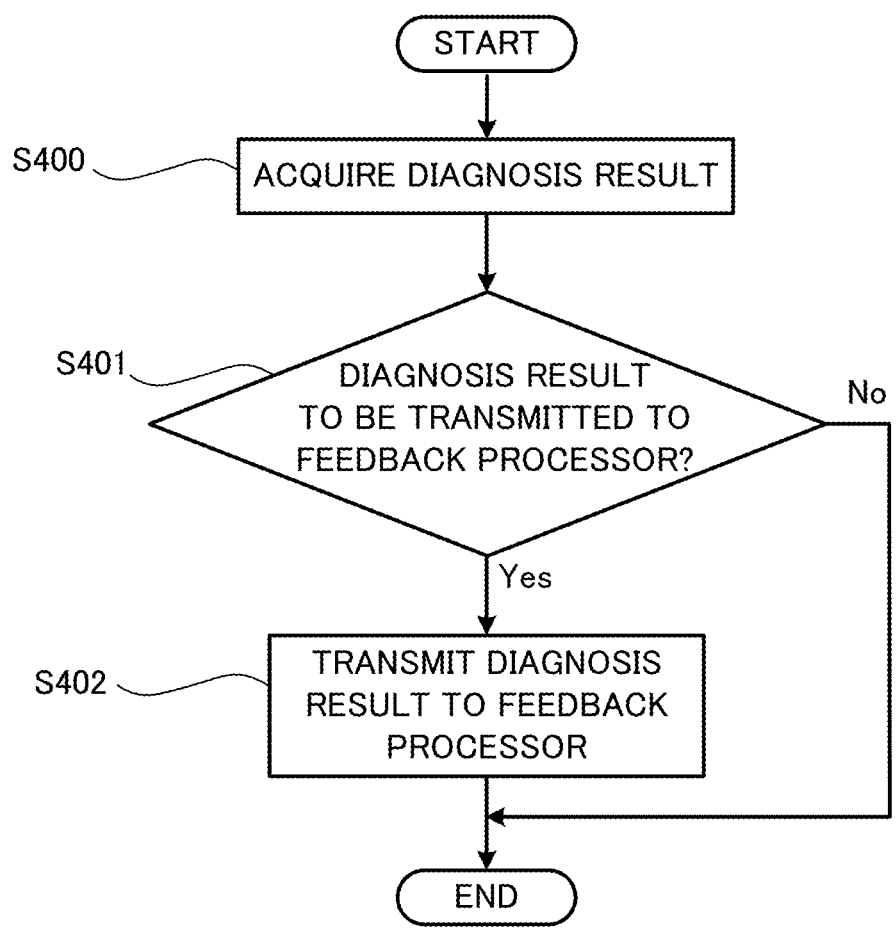
FIG. 5 is a flowchart of a process of selecting feedback-receiving data in Embodiment 1.

The feedback process performed in step S104 in FIG. 2 is now described with reference to FIGS. 5 and 6. FIG. 5 is a flowchart of the process of selecting feedback-receiving data, and FIG. 6 is a flowchart of the feedback process.

In the flowchart in FIG. 5, the feedback-receiving data selector 114 acquires a diagnosis result from the diagnosis result storage 103 (step S400). Subsequently, the feedback-receiving data selector 114 determines whether to transmit the acquired diagnosis result to the feedback processor 115 (step S401). The determination as to whether to transmit the acquired diagnosis result may be performed stochastically using a preset probability or based on whether the diagnosis result satisfies a predetermined condition, or using a combination of these methods. For the determination performed stochastically, the probability is set to 100% to transmit any diagnosis result. For the determination performed using the predetermined condition, for example, the diagnosis result acquired in a specific abnormal mode may be selected.

Subsequently, when determining to transmit the acquired diagnosis result to the feedback processor 115 (Yes in step S401), the feedback-receiving data selector 114 transmits the diagnosis result to the feedback processor 115 (step S402). When determining not to transmit the acquired diagnosis result to the feedback processor 115 (No in step S401), the feedback-receiving data selector 114 ends the process.

Figure 6:
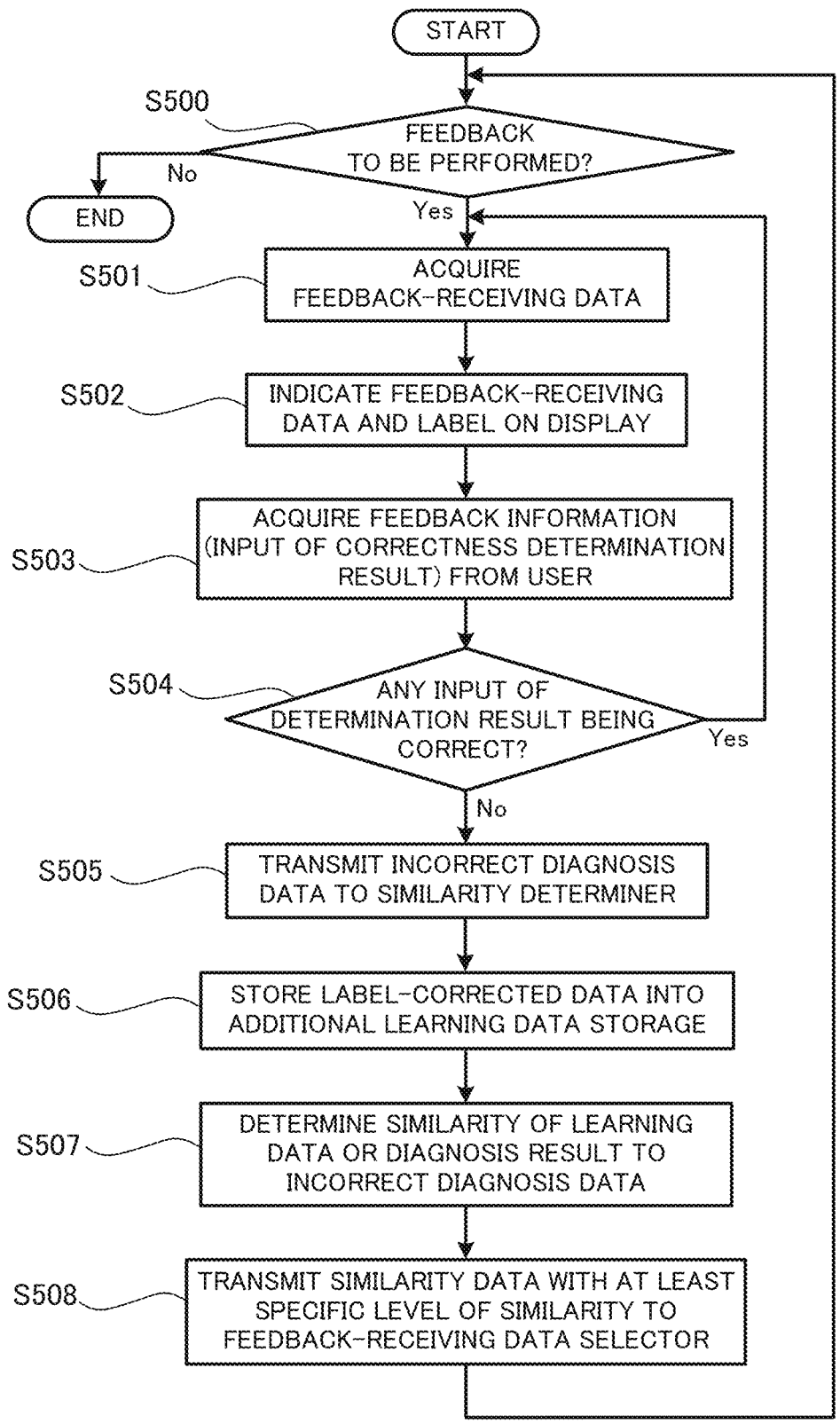
FIG. 6 is a flowchart of a feedback process.

In the flowchart in FIG. 6, the feedback processor 115 first determines whether to perform feedback (step S500). The feedback is determined to be performed when, for example, the accumulated pieces of feedback-receiving data transmitted from the feedback-receiving data selector 114 include any piece of data that has yet to receive any feedback or when the user has yet to perform an operation to stop the feedback.

When determining to perform feedback (Yes in step S500), the feedback processor 115 acquires a piece of the feedback-receiving data transmitted from the feedback-receiving data selector 114 (step S501). In this example, the feedback-receiving data is a diagnosis result. When determining not to perform feedback (No in step S500), the feedback processor 115 ends the process.

The feedback processor 115 causes the display 120 to display the acquired feedback-receiving data (step S502). The feedback-receiving data includes a data label. The feedback processor 115 prompts the user to input a result of determination as to whether the label is correct. When the label is incorrect, the feedback processor 115 causes the display 120 to output a display screen prompting the user to input a correct label.

The feedback processor 115 acquires a user input indicating a result of correctness determination that is the feedback information input by the user into the input device 130 (step S503). When receiving a user input indicating that the label is correct (Yes in step S504), the feedback processor 115 returns to step S501. When receiving a user input indicating that the label is incorrect (No in step S504), the feedback processor 115 transmits the diagnosis result to the similarity determiner 113 as incorrect diagnosis data (step S505). The feedback processor 115 also stores, into the additional learning data storage 102, the label-corrected data resulting from correction of the label of the diagnosis result as additional learning data (step S506).

Subsequently, the similarity determiner 113 acquires, from the learning data storage 101, a learning data piece that has yet to receive any feedback or acquires, from the diagnosis result storage 103, a diagnosis result that has yet to receive any feedback to determine the similarity of the acquired learning data or diagnosis result to the incorrect diagnosis data (determining similarity in step S507). After transmitting similarity data having at least a specific level of similarity to the feedback-receiving data selector 114 (step S508), the similarity determiner 113 returns to step S500. The similarity data herein refers to learning data or diagnosis result data determined to have at least a specific level of similarity to the incorrect diagnosis data before undergoing label correction and thus determined to be similar to the incorrect diagnosis data. When no similarity data having at least a specific level of similarity is available in step S508, the similarity determiner 113 returns to step S500 without transmitting data. In other words, determination in step S507 is a process of extracting similarity data similar to incorrect diagnosis data including the label of the diagnosis result determined by the user to be incorrect. The extracted similarity data is a candidate for feedback-receiving data.

When the similarity data is transmitted to the feedback-receiving data selector 114 (step S508), and the feedback-receiving data selector 114 selects the similarity data, the feedback processor 115 performs a feedback process on the similarity data (additionally performing the feedback process in steps S500 to S506).

In step S507, the similarity determiner 113 determines that the learning data acquired from the learning data storage 101 or the diagnosis result acquired from the diagnosis result storage 103 has high similarity to the incorrect diagnosis data when, for example, (1) the learning data or the diagnosis result has the same label as the diagnosis result determined to be incorrect (incorrect diagnosis data) or (2) the distance between the learning data or the diagnosis result and the diagnosis result determined to be incorrect (incorrect diagnosis data) is shorter than the mean distance between each of other pieces of data and the incorrect diagnosis data.

The distance between the data pieces in (2) may be the Euclidean distance or a distance calculated by dynamic time warping. In some embodiments, the distance may be calculated after dimensionality reduction is performed, for example, with an autoencoder.

In step S500, the user may preset the time to determine whether to perform feedback. In one example, feedback may be performed upon every diagnosis performed by the diagnoser 112. In another example, feedback may be determined to be performed periodically. For periodic feedback, the user may set the determination period as appropriate. To increase the accuracy of the model, the user may set a shorter determination period to increase feedback frequency. To reduce the user burden on inputting feedback rather than increasing the model accuracy, the user may set a longer determination period to reduce feedback frequency.

When the user viewing the feedback-receiving data displayed in step S502 cannot determine whether the label of the diagnosis result is correct, the feedback process may be suspended. After a preset period elapses, the feedback processor 115 can cause the feedback-receiving data to be displayed again and resume the feedback process on the diagnosis result for which feedback has been suspended. The user may not be able to determine whether the label of the diagnosis result is correct when, for example, the diagnosis result displayed is a sign of a device failure. In this case, the correctness of the diagnosis result is not identified until the device fails. Thus, the user cannot determine whether the label is correct.

The period before the feedback-receiving data is displayed again may be set upon suspension of the feedback process. Without any period being input, the feedback-receiving data is returned to the feedback-receiving data selector 114 and transmitted to the feedback processor 115 again at a preset time in the same manner as for the other pieces of feedback-receiving data.

Figure 7:
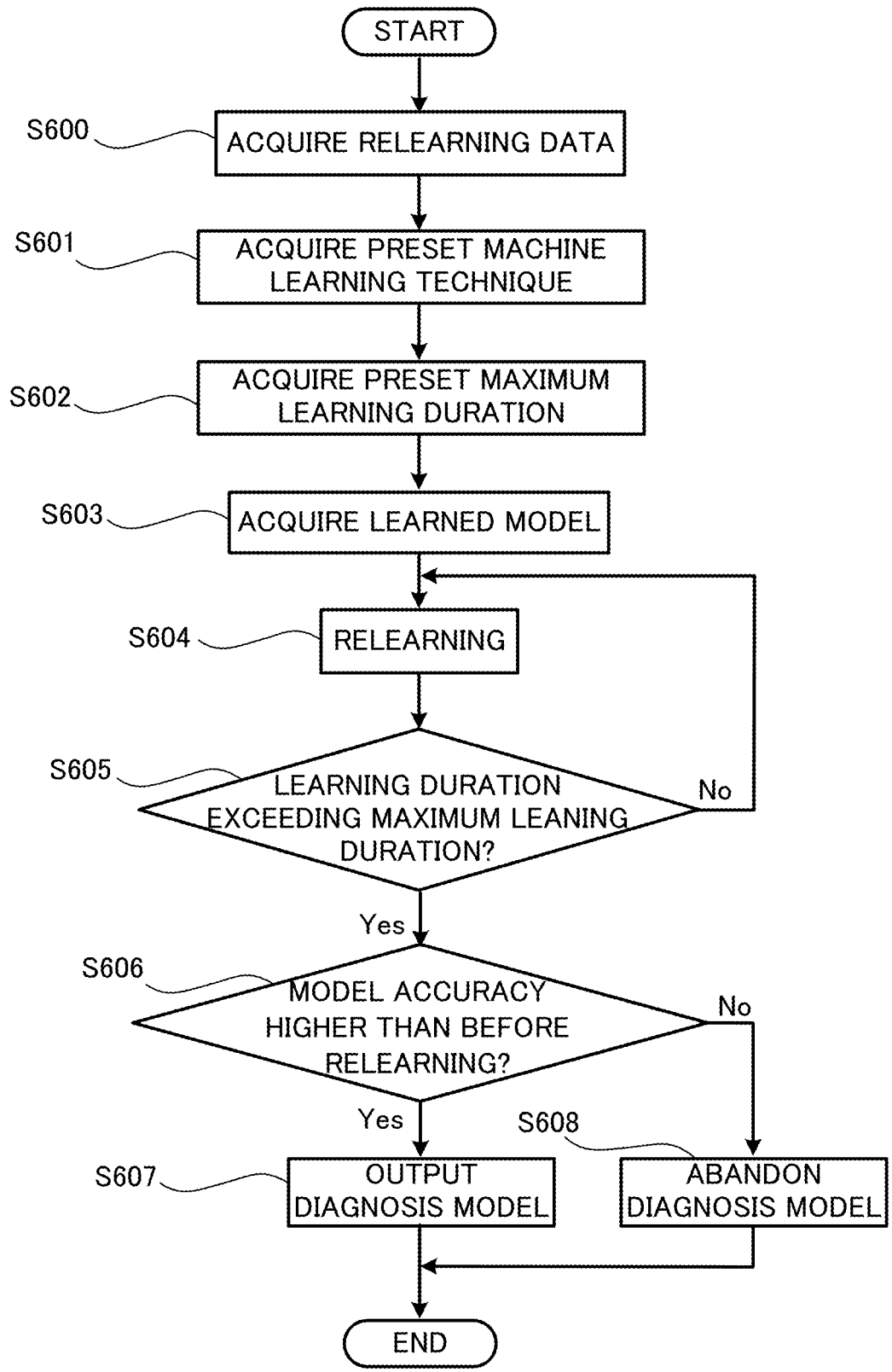
FIG. 7 is a flowchart of a relearning process.

The relearning process performed in step S106 in FIG. 2 is now described. FIG. 7 is a flowchart of the relearning process.

The learner 111 first acquires, for relearning, learning data from the learning data storage 101 and additional learning data from the additional learning data storage 102 (step S600). The additional learning data has the label corrected in the feedback process. The learner 111 then acquires a preset machine learning technique (step S601) and a preset maximum learning duration (step S602).

Subsequently, the learner 111 acquires a learned diagnosis model output in step S207 in FIG. 3 (step S603). The learner 111 then updates the learned diagnosis model using the relearning data acquired in step S600. The update of the diagnosis model is referred to as relearning (step S604) in the examples described below. During relearning, the learner 111 determines, at predetermined intervals, whether the learning duration has exceeded the maximum learning duration acquired in step S602 (step S605). When the learning duration has exceeded the maximum learning duration (Yes in step S605), the learner 111 stops relearning and advances to step S606. When the learning duration has yet to exceed the maximum learning duration (No in step S605), the learner 111 returns to step S604.

After the learning duration has exceeded the maximum learning duration and relearning is stopped, the learner 111 determines whether the diagnosis model at that time has higher model accuracy than the diagnosis model acquired in step S603 (step S606). When the model accuracy is higher (Yes in step S606), the learner 111 outputs the relearned diagnosis model to the diagnoser 112 (step S607) and ends the process. When the model accuracy has yet to be higher (No in step S606), the learner 111 abandons the relearned diagnosis model (step S608) and ends the process.

Relearning may be performed when (1) the number of additional learning data pieces reaches or exceeds a preset number of pieces, (2) a preset period has elapsed, (3) a preset appointed time has passed, or (4) a relearning instruction is input from the user.

As described above, in the learning system 1 according to the present embodiment, the diagnoser 112 diagnoses diagnosis target data with the diagnosis model generated by the learner 111 through machine learning using learning data, and stores the diagnosis results. The feedback processor 115 performs the feedback process on one of the diagnosis results selected as the feedback-receiving data. The feedback processor 115 prompts the user to determine whether the label of the selected diagnosis result is correct. When the user determines that the label is incorrect, the feedback processor 115 corrects the label, and stores the diagnosis result into the additional learning data storage 102. The similarity determiner 113 determines the similarity of unselected learning data or diagnosis results to the incorrect diagnosis data. The feedback processor 115 performs an additional feedback process on the similarity data determined as having high similarity. The learner 111 then performs relearning using the learning data stored in the learning data storage 101 and the learning data stored in the additional learning data storage 102.

In this manner, relearning is performed using the similarity data similar to the incorrect diagnosis data determined to be incorrect in the feedback process. This generates a diagnosis model achieving a highly accurate diagnosis.

The feedback-receiving data selector 114 selects data pieces with a label highly likely to be incorrect and provides feedback on such data pieces intensively, thus increasing the quality of data labeling efficiently.

The opportunity of feedback is provided at predetermined times, rather than when an alarm is output. This allows the user to stay calm in determining whether the diagnosis result is correct. In addition to the data determined to be abnormal by the diagnosis system, the data determined to be normal can also undergo user determination as to whether the data label is correct to receive feedback.

Embodiment 2

Embodiment 2 of the present disclosure is described below in detail with reference to the drawings. The same reference signs denote the same or corresponding components in the drawings.

As in Embodiment 1, the learning system 1 according to Embodiment 2 generates, through learning, a diagnosis model for diagnosing the state of production equipment or the qualities of products at a production site, and includes the same components as the learning system 1 according to Embodiment 1 illustrated in FIG. 1.

The learning system 1 according to Embodiment 2 performs a diagnosis model generating process similar to the process in Embodiment 1 illustrated in FIG. 2, but differs from the learning system 1 according to Embodiment 1 in the information output in the diagnosis process (step S102 in FIG. 2) performed by the diagnoser 112 and the details of the feedback process (step S104 in FIG. 2). The differences are now described in detail.

In addition to the diagnosis result including the operating state of the device or the qualities of components or products acquired from the diagnosis process in step S102 in FIG. 2, the diagnoser 112 outputs a diagnosis certainty factor. The diagnosis certainty factor may be a value defined by a known function, or for example, defined by a softmax function of a neural network.

The diagnoser 112 stores, into the diagnosis result storage 103, the diagnosis certainty factor and the diagnosis result including the output operating state of the device or the output qualities of components or products. The diagnoser 112 may store, into the diagnosis result storage 103, the diagnosis result and the diagnosis certainty factor in a manner associated with each other.

The diagnosis result data transmitted by the feedback-receiving data selector 114 to the feedback processor 115 is selected based on criteria including the diagnosis certainty factor being less than or equal to a threshold, in addition to the similarity determined by the similarity determiner 113 being at least a specific level.

Figure 8:
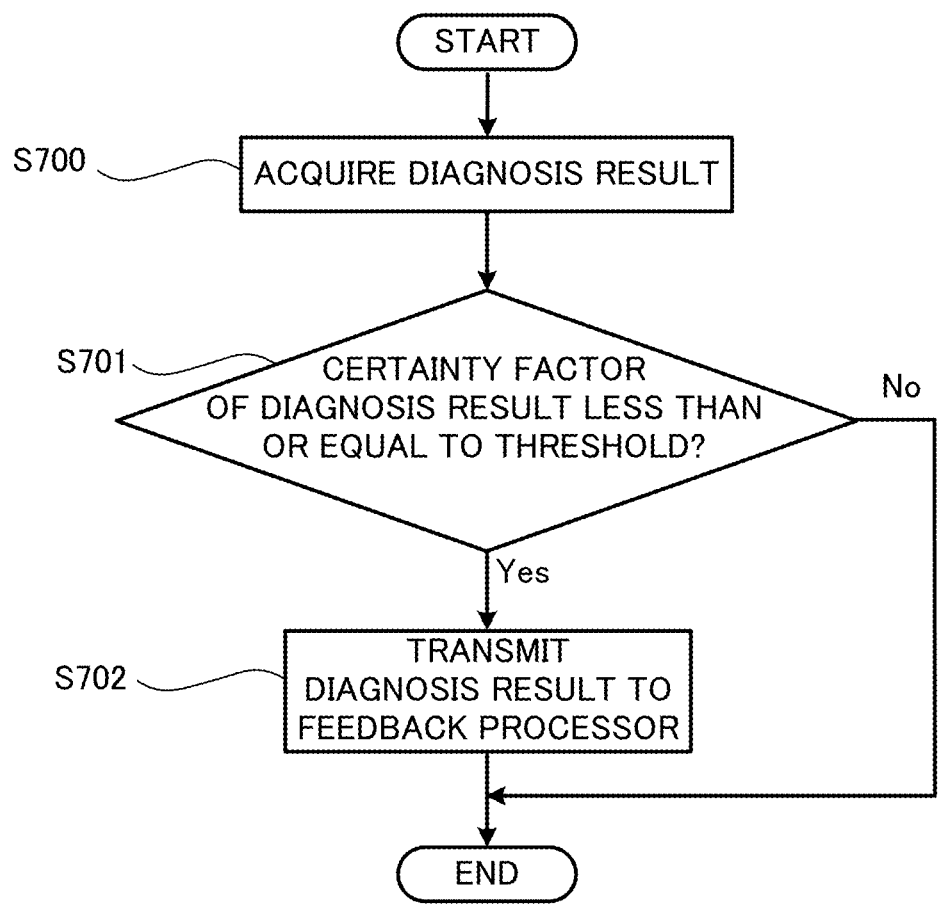
FIG. 8 is a flowchart of a process of selecting feedback-receiving data in Embodiment 2.

FIG. 8 is a flowchart of a process of selecting feedback-receiving data in Embodiment 2. The process of selecting feedback-receiving data is described with reference to FIG. 8.

The feedback-receiving data selector 114 acquires a diagnosis result from the diagnoser 112 (step S700). Subsequently, the feedback-receiving data selector 114 determines whether the certainty factor of the diagnosis result is less than or equal to a preset threshold (step S701). When the certainty factor exceeds the threshold (No in step S701), the diagnosis is performed with at least a specific level of certainty. Thus, the feedback-receiving data selector 114 ends the process without performing feedback, and waits until the next diagnosis is performed. When the certainty factor is less than or equal to the threshold (Yes in step S701), the feedback-receiving data selector 114 transmits the diagnosis result to the feedback processor 115 (step S702), and ends the process.

As described above, the learning system 1 according to Embodiment 2 outputs the diagnosis result and the certainty factor of the diagnosis result when the diagnoser 112 diagnoses the diagnosis target data with the diagnosis model generated by the learner 111 through machine learning using the learning data, and stores the diagnosis result and the certainty factor into the diagnosis result storage 103. The feedback-receiving data selector 114 selects a diagnosis result with the certainty factor of less than or equal to the threshold as feedback-receiving data. The feedback processor 115 performs the feedback process on the selected diagnosis result. In this manner, the feedback processor 115 performs the feedback process on the diagnosis result with a low diagnosis certainty factor selected by the feedback-receiving data selector 114. This increases the feedback efficiency.

Modifications

The above embodiments may be altered in various manners.

Although the diagnosis target data to be diagnosed by the diagnoser 112 is input through the input device 130 in the above embodiment, the diagnosis target data may be, for example, learning data stored in the learning data storage 101 and acquired by the diagnoser 112.

In Embodiment 2, the learning data stored in the learning data storage 101 is diagnosed as the diagnosis target data to output the certainty factor of the learning data. The learning data may be stored in the learning data storage 101 in a manner associated with the output certainty factor. The learner 111 may learn with the learning data including the certainty factor.

The hardware configuration of the learning system 1 according to the above embodiments and the processes performed by the processing unit 110 are mere examples, and can be altered or modified as appropriate. Instead of a dedicated system, a common computer system may implement the functions of the learning system.

For example, programs for performing the operations in the above embodiments may be stored in a non-transitory computer-readable recording medium such as a compact disc read-only memory (CD-ROM), a digital versatile disc (DVD), a magneto-optical (MO) disk, or a memory card for distribution, and installed in a computer to implement the functions. In the system with the functions implementable by the operating system (OS) and an application in a shared manner or through cooperation between the OS and the application, portions executable by the application other than the OS may be stored in a non-transitory recording medium.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Learning system
100 Storage
101 Learning data storage
102 Additional learning data storage
103 Diagnosis result storage
110 Processing unit
111 Learner
112 Diagnoser
113 Similarity determiner 114 Feedback-receiving data selector
115 Feedback processor
120 Display
130 Input device

The invention claimed is:

1. A learning system, comprising:
processing circuitry
   to generate a diagnosis model through machine learning using learning data;
   to diagnose diagnosis target data based on the diagnosis model, and to output diagnosis results;
   to perform a feedback process to indicate at least one of the diagnosis results to a user, output incorrect diagnosis data when acquiring a user input indicating that the at least one diagnosis result is incorrect, and to correct the incorrect diagnosis data based on the user input;
   to determine similarity, to the incorrect diagnosis data output in the feedback process before being corrected, of the learning data yet to undergo the feedback process, and to perform, when determining that the learning data includes similarity data that is learning data with at least a specific level of similarity, the feedback process to indicate at least one of the similarity data to the user, output the incorrect diagnosis data when acquiring a user input indicating that the at least one similarity data is incorrect, and correct the incorrect diagnosis data based on the user input; and
   to perform relearning using data including the incorrect diagnosis data corrected in the feedback process.

2. The learning system according to claim 1, wherein the processing circuitry selects as feedback-receiving data, from the diagnosis results, a diagnosis result to undergo the feedback process and performs the feedback process on the selected diagnosis result.

3. The learning system according to claim 2, wherein the processing circuitry
   selects, in the selection of the feedback-receiving data, the diagnosis result based on a preset probability or the diagnosis result satisfying a predetermined condition.

4. The learning system according to claim 3, wherein
   the learning data includes (i) information indicating a device, a component, or a product, and (ii) information indicating a label indicating a class of data representing the device, the component, or the product, and
   the processing circuitry diagnoses the diagnosis target data to assign the diagnosis target data with the label selected based on a result of the diagnosis, and performs a feedback process to indicate the label of the diagnosis target data to a user, and correct, when acquiring a user input indicating that the diagnosis result is incorrect, the label based on the user input.

5. The learning system according to claim 2, wherein
   the diagnosis result information includes a diagnosis certainty factor, and
   the processing circuitry selects as the feedback-receiving data a diagnosis result with the diagnosis certainty factor less than or equal to a predetermined threshold.

6. The learning system according to claim 5, wherein
   the learning data includes (i) information indicating a device, a component, or a product, and (ii) information indicating a label indicating a class of data representing the device, the component, or the product, and
   the processing circuitry diagnoses the diagnosis target data to assign the diagnosis target data with the label selected based on a result of the diagnosis, and performs a feedback process to indicate the label of the diagnosis target data to a user, and correct, when acquiring a user input indicating that the diagnosis result is incorrect, the label based on the user input.

7. The learning system according to claim 2, wherein
   the learning data includes (i) information indicating a device, a component, or a product, and (ii) information indicating a label indicating a class of data representing the device, the component, or the product, and
   the processing circuitry diagnoses the diagnosis target data to assign the diagnosis target data with the label selected based on a result of the diagnosis, and performs a feedback process to indicate the label of the diagnosis target data to a user, and correct, when acquiring a user input indicating that the diagnosis result is incorrect, the label based on the user input.

8. The learning system according to claim 1, wherein
   the learning data includes (i) information indicating a device, a component, or a product, and (ii) information indicating a label indicating a class of data representing the device, the component, or the product, and
   the processing circuitry diagnoses the diagnosis target data to assign the diagnosis target data with the label selected based on a result of the diagnosis, and
   performs a feedback process to indicate the label of the diagnosis target data to a user, and correct, when acquiring a user input indicating that the diagnosis result is incorrect, the label based on the user input.

9. The learning system according to claim 1, wherein the processing circuitry further determines similarity, to the incorrect diagnosis data output in the feedback process before being corrected, of another diagnosis result of the diagnosis results, and performs, when determining that the another diagnosis result includes similarity data that is a diagnosis result with at least a specific level of similarity, the feedback process.

10. A learning method, comprising:
   generating a diagnosis model through machine learning using learning data;
   diagnosing diagnosis target data based on the diagnosis model;
   performing a feedback process to output incorrect diagnosis data based on a user input for a result of the diagnosis, and correct the incorrect diagnosis data based on the user input;
   determining similarity, to the output incorrect diagnosis data before being corrected, of the learning data yet to undergo the feedback process, and determining whether the learning data includes similarity data that is learning data with at least a specific level of similarity;
   additionally performing the feedback process to indicate at least one of the similarity data determined to have at least the specific level of similarity to the user, output the incorrect diagnosis data when acquiring a user input indicating that the at least one similarity data is incorrect, and correct the incorrect diagnosis data based on the user input; and
   performing relearning using data including the incorrect diagnosis data corrected in the additional feedback process.

11. A non-transitory computer-readable recording medium storing a program, the program causing a computer to perform a method comprising:
   generating a diagnosis model through machine learning using learning data, diagnosing diagnosis target data based on the diagnosis model, performing a feedback process to output incorrect diagnosis data based on a user input for a result of the diagnosis performed, and to correct the incorrect diagnosis data based on the user input, and determining similarity, to the output incorrect diagnosis data before being corrected, of the learning data yet to undergo the feedback process and determining whether the learning data includes similarity data that is learning data with at least a specific level of similarity, wherein the feedback process is additionally performed to indicate at least one of the similarity data determined to have at least the specific level of similarity to the user, output the incorrect diagnosis data when acquiring a user input indicating that the at least one similarity data is incorrect, and correct the incorrect diagnosis data based on the user input, and relearning is performed using data including the corrected incorrect diagnosis data.

* * * * *